[19] United States Patent
Burns

[11] 3,880,000
[45] Apr. 29, 1975

[54] METHOD AND APPARATUS FOR MONITORING AND CONTROLLING AMBULANT STRIP MATERIALS, ESPECIALLY SUITABLE FOR USE IN THE MANUFACTURE OF INSULATORS FOR INDUCTIVE DEVICES

[75] Inventor: Richard D. Burns, Holland, Mich.

[73] Assignee: General Electric Company, Fort Wayne, Ind.

[22] Filed: Jan. 5, 1972

[21] Appl. No.: 215,543

[52] U.S. Cl. .................... 73/159; 33/147 L; 226/25
[51] Int. Cl. .......................... G01b 5/04; G01b 5/06
[58] Field of Search .................... 226/11, 25, 45, 1; 33/147 L, 148 H; 73/159, 160; 200/61.13; 340/259

[56] References Cited
UNITED STATES PATENTS

| | | | |
|---|---|---|---|
| 2,242,889 | 5/1941 | Keeler | 73/160 |
| 2,636,951 | 4/1953 | Fahringer | 73/160 |
| 3,264,740 | 8/1966 | Veale | 73/159 |
| 3,512,772 | 5/1970 | Van Doorn | 226/11 |

Primary Examiner—S. Clement Swisher
Assistant Examiner—Denis E. Corr
Attorney, Agent, or Firm—Ralph E. Krisher, Jr.

[57] ABSTRACT

A method of monitoring and controlling ambulant strip materials in the manufacturing of insulators for magnetic core. Monitoring and controlling occurs at readily accessible location. Material passes along predetermined path with at least one edge passing an actuator having a strip engaging portion adapted to engage the strip and move when the strip of material is beyond preselected dimensional limits. Portion of strip edge engages engaging portion when strip exceeds preselected dimensional limits. Strip engaging portion moves generally parallel to predetermined path and impedes further passage of strip. Movement of strip regulated by actuating means for controlling strip movement in response to actuator movement. Regulated movement may be achieved by stopping strip. Presence or absence of strip detected and movement of existing portion of strip terminated when absence is detected. Variations in material dimensions, breaks, or other imperfections of magnitude to cause damage or otherwise interfere with components of equipment are monitored and controlled. Potential interference with component operation is indicated at accessible location to save time, and avoid difficulties.

23 Claims, 6 Drawing Figures

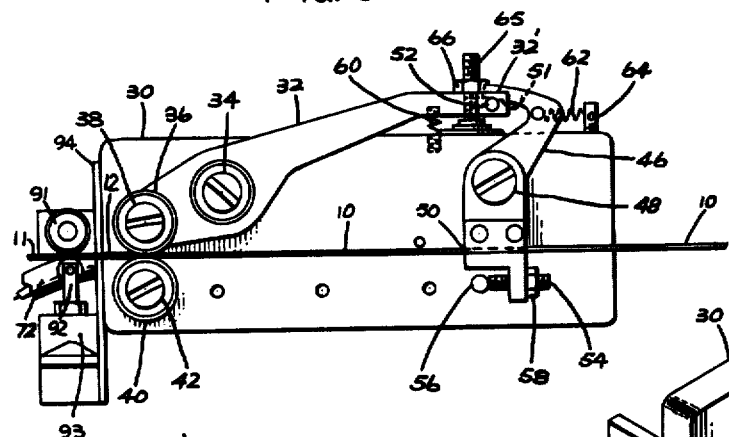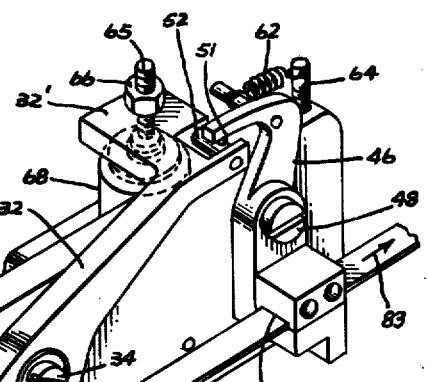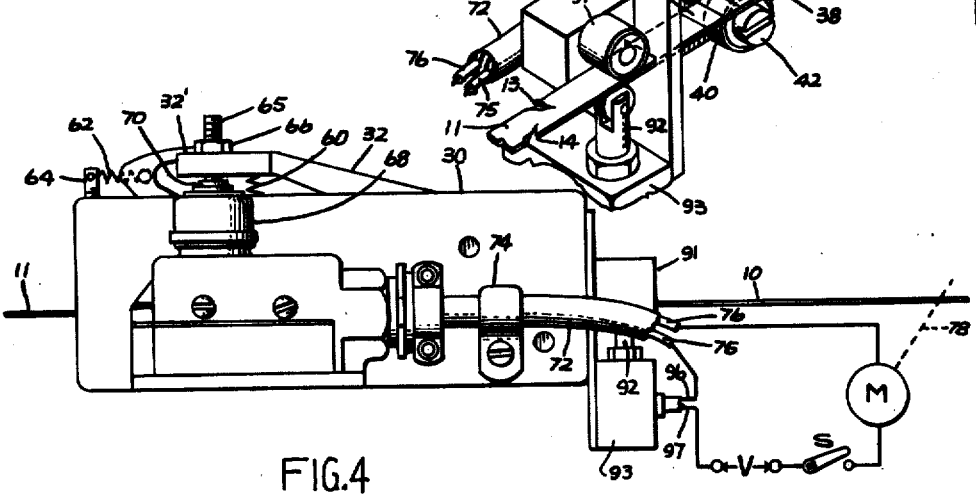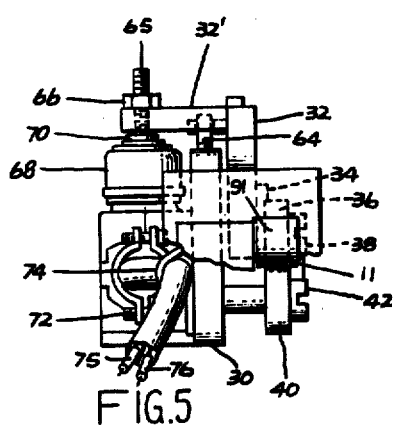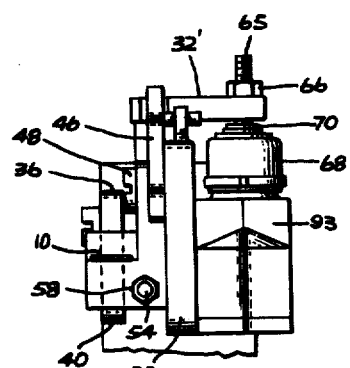
FIG. 3
FIG. 2
FIG. 4
FIG. 5
FIG. 6

METHOD AND APPARATUS FOR MONITORING AND CONTROLLING AMBULANT STRIP MATERIALS, ESPECIALLY SUITABLE FOR USE IN THE MANUFACTURE OF INSULATORS FOR INDUCTIVE DEVICES

BACKGROUND OF THE INVENTION

This invention relates to methods and apparatus for monitoring and controlling ambulant strip materials, and to such monitoring and controlling that is achieved in connection with methods and apparatus for forming insulators fabricated from flexible strip material which are used in the slots of inductive devices.

Many processes and machines employ ambulant strip materials which must not exceed or be less than a predetermined dimension in width or thickness or both. In such situations methods or apparatus must be employed to monitor the ambulant strip materials in order to recognize those portions which surpass such dimensional limitations. Upon recognition of the presence of such a dimensional variance in the material an informational signal may be generated or an event or train of events instituted. A common event frequently so instituted is that of arresting further movement of the ambulant strip material itself in order that the sensed portion may be inspected and perhaps discarded. Such control may in turn prevent further processing of defective strip materials or safeguard machinery to which the oversized or undersized material is being fed.

In the manufacture of insulators for use in slots of inductive devices, for instance slots of magnetic cores, where the insulators are formed from ambulant dielectric strip material which is relatively thin in cross section and relatively flexible, satisfactory monitoring and controlling of the material is especially important yet difficult to achieve. For example, difficulty is experienced in the forming from flexible strip material, such as compressed dielectric paper or resilient film of polyethylene terephthalate, of wedge like insulators of the type disclosed in the R. B. Arnold and D. F. Smith U.S. Pat. No. 3,579,818 issued May 25, 1971 and the D. E. Hill U.S. Pat. No. 3,324,536 issued June 13, 1967. Strips of material are normally butt welded together, by sonic welding or the like, or otherwise spliced together in end to end relation to provide a continuous roll of strip material which is then fed from a storage roll to an insulatorforming mechanism at an insulator-forming station. For instance, in the illustrated exemplification seen in FIGS. 1-3 dielectric strip 10 is held in end to end relation with strip 11 by a very thin (less than 1 mil) piece of adherent tape 12 placed on one side of the adjacent strip. In one application, the strip is about 0.014 inch (14 mils) thick and 7/16 inch wide (nominal dimensions). A variation beyond preselected dimensions where the strips are joined together in end to end fashion, of thickness, or of width as little as several mils may result in the jamming of the insulatorforming mechanism which fabricates the insulators. Also, the strip material may include breaks, slivers, or other cuts such as that indicated by numberals 13, 14, in strip 10 shown in FIGS. 1-3, which can adversely affect the forming operation.

These conditions take time to correct and may ultimately result in "down time" for the equipment and a corresponding loss of production. In some applications, such as that shown in the aforementioned Hill patent, the insulator-forming station where the jam could occur may be mounted in a relatively inaccessible location, further complicating the problem of attempting to correct the situation. Moreover, where adherent tape is used to hold the ends adjacent one another, the tape may become loose and curl slightly, producing interference with proper operation of the insulator-forming station. Further the tape may even become entirely displaced thereby permitting the ends of the adjacent strips to become separated, which in turn prevents the proper feeding of the strip to the insulatorforming mechanism of the station.

In some other applications insulators are formed from laminated strip material provided by two or more layers of strips suitably joined together. Should the layers become delaminated or otherwise separated before use, difficulties may be experienced in the proper operation of the insulatorforming assembly.

Accordingly, it is an object of the present invention to provide improved methods and apparatus for monitoring and controlling ambulant strip materials. It is another object of the invention to provide improved methods and apparatus for monitoring and controlling ambulant strip material in the manufacture of insulators for use in slots of inductive devices which overcome the at least some of the problems mentioned above.

It is yet another object of the invention to provide an improved method and apparatus for monitoring one or more dimensions of ambulant strip material.

Another object of the invention is to provide an improved method and apparatus for monitoring one ore more dimensions of ambulant strip material and for controlling movement of strip material sensed as having at least one dimension at exceeding a preselected maximum or minimum dimensional value.

SUMMARY OF THE INVENTION

In one form the present invention is a method of monitoring and controlling ambulant strip materials in the manufacture of insulators for use in slots of magnetic cores, the steps comprising: (a) passing a strip of material along a predetermined path with at least one strip edge passing closely adjacent an actuator having an actuator strip engaging portion adapted to be moved generally parallel the predetermined path when the strip of material is beyond preselected dimensions; (b) bringing a portion of the strip edge into engagement with the actuator strip engaging portion when the strip of material exceeds the preselected dimensions causing the actuator strip engaging portion to move in one direction generally parallel the predetermined path and to impede further passage of the strip along the predetermined path; and (c) regulating movement of the strip of material by actuating means for controlling movement of the strip of material in response to movement of the actuator the regulated movement may be achieved by terminating the passing of the strip of material along the predetermined path in response to actuation of the means for controlling movement of the strip material. Also the presence or absence of the strip of material may be detected along the predetermined path and movement of the strip of material terminated when such absence is detected.

In regard to one form of apparatus of the present invention for monitoring and controlling ambulant strip material which is capable of practicing the method, it comprises a switch adapted to be connected between drive means for driving strip material and energizing means for energizing the drive means. Actuating means are also provided for actuating the switch. The switch actuating means includes a strip material engaging member which defines at least part of a path along which strip material driven by the drive means may be passed. The strip material engaging member is mounted for limited movement generally parallel to the path. With this combination of elements the switch may be actuated and the drive means thereby de-energized in the event a portion of strip material being monitored exceeds the preselected dimensions and engages the strip material engaging member thereby causing the switch actuating means to actuate the switch. Movement of the strip of material may thus be interrupted before the problem area on the strip reaches other mechanisms where such problem could ultimately cause serious damage to other components of the equipment.

BRIEF DESCRIPTION OF THE DRAWINGS

FIG. 2 is an enlarged perspective view of a portion of the apparatus seen in FIG. 1;

FIG. 3 is a view in elevation of one side of the apparatus shown in FIG. 2;

FIG. 4 is a view in elevation of another side of the apparatus shown in FIG. 2. Included in this figure is a schematic diagram illustrating a preferred manner by which a part of the apparatus may be electrically connected to ancillary drive means;

FIG. 5 is a front view in elevation of the apparatus shown in FIG. 2; and

FIG. 6 is a rear view in elevation of the apparatus shown in FIG. 2.

DESCRIPTION OF THE PREFERRED EMBODIMENTS

Figure 1:
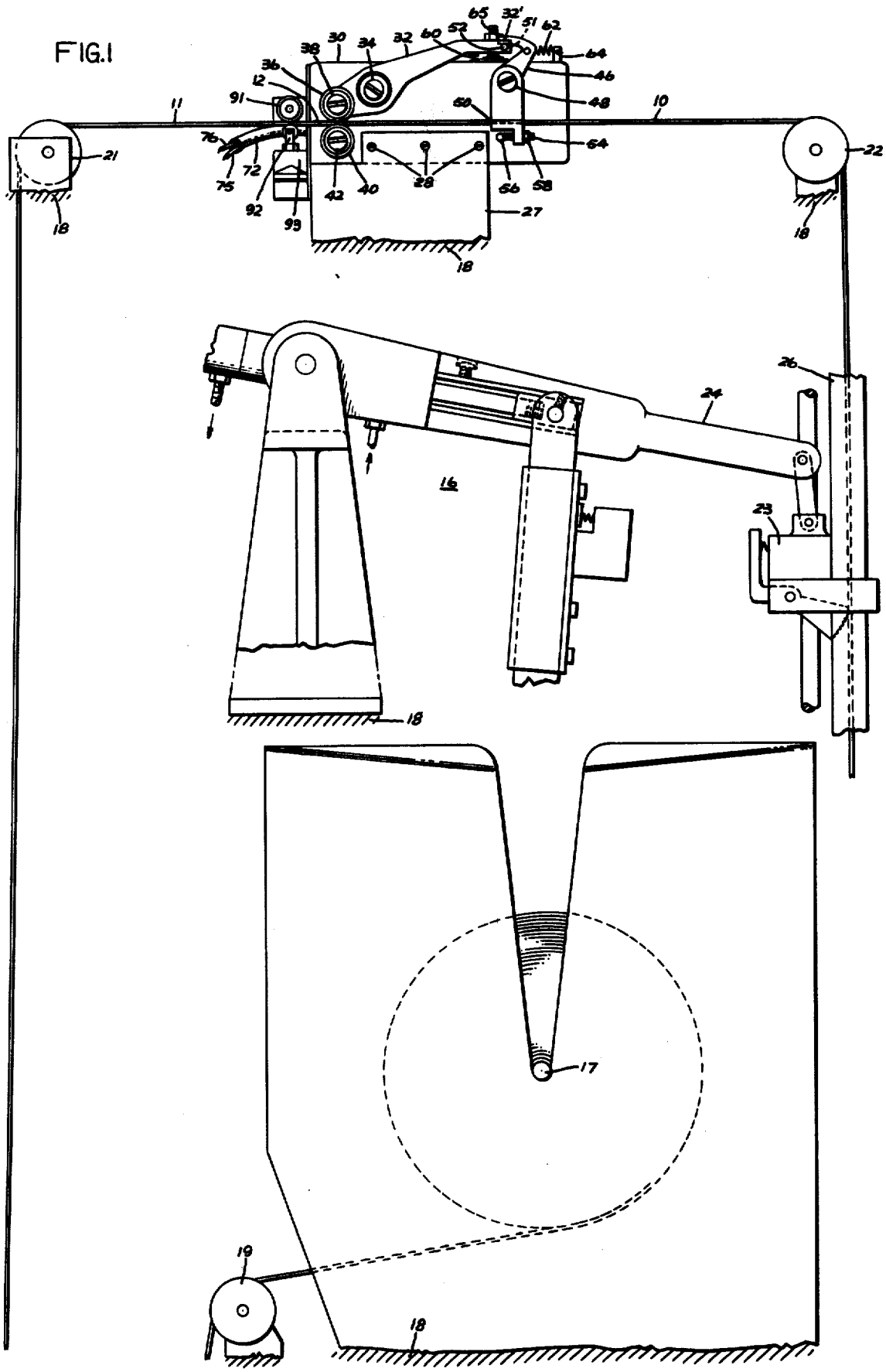
FIG. 1 is a view in elevation, partially broken away, of a portion of apparatus, embodying a preferred form of the invention, which is capable of practicing the preferred method in connection with the manufacture of insulators for use in slots of inductive devices, such as magnetic cores.

Referring now in more detail to the drawings there is illustrated in FIGS. 1-6 a preferred embodiment of improved apparatus which is capable of practicing one form of the method of the present invention illustrated in connection with the manufacture of insulators for use in slots of inductive devices, e.g., magnetic cores (not shown) from an ambulant strip of material in the form of relatively thin dielectric material.

More specifically, FIG. 1 illustrates the type of insulator-forming station, generally indicated by numeral 16, more completely disclosed in the Arnold and Smith U.S. Pat. No. 3,579,818 which is incorporated herein by reference. By way of exemplification only, a continuous strip of dielectric material formed by strips 10, 11 is fed from material storage reel 17 rotatably mounted to main frame 18, over separated pulleys 19, 21, 22 into the insulator-forming part of the station. Only a portion of the feed mechanism 23 with its lever type arm 24 and insulation travel path provided by guide plates 26 are shown in detail. The part of the station and insulator travel path beyond plates 26 are not revealed in FIG. 1 for reasons of brevity since they may be, if desired, identical with that disclosed in the Arnold and Smith patent.

In order to monitor and control strip materials 10, 11 being fed at station 16 so that it moves only when it is within preselected dimensions (such as those mentioned above in regard to one application) and effectively overcomes the difficulties mentioned heretofore, improved apparatus is mounted to main frame 18 between pulleys 21, 22 by plate 27 and screws 28 at a location remote from the insulator-forming part of the station in the path of travel of strips 10, 11. In its preferred form the apparatus comprises a mounting frame 30 to which lever 32 is pivotally mounted by shoulder screw 34. Roller 36 is rotatably mounted to one end of lever 32 by shoulder screw 38. Roller 40 is rotatably mounted to frame 30 closely adjacent roller 36 by shoulder screw 42 the axis of which screw parallels that of shoulder screw 38. With this disposition strip of material 10, 11 may be passed between rollers 36 and 40 in contact therewith.

To frame 30 is also pivotally mounted lever 46 by means of shoulder screw 48. A lower portion of lever 46 defines a slot 50 through which strip material 10, 11 may be passed as illustrated. As mounted, a cam surface 51 of an upper portion of lever 46 contacts bearing 52 which bearing is pivotally mounted between two spaced portions of lever 32. An adjust screw 54 is threaded through lever 46 into contact with dowel pin 56 which pin extends from the mounting frame 30. Nut 58 is run up upon adjust screw 54 flush against lever 46 in effecting positional adjustment of the levers as hereinafter explained.

Lever 32 is spring biased by compression spring 60 the ends of which spring are respectively seated in aligned recesses in the lever and mounting frame. Lever 46 is spring biased by tension spring 62 one end of which is held by retainer pin 64 which pin is secured to mounting frame 30. Contact by adjust screw 54 with dowel pin 56 limits clockwise movement, as viewed in FIG. 3, of lever 46 in counter-balancing the force exerted thereon by tension spring 62. Cam surface 51 of lever 46 itself limits counterclockwise movement, also as viewed in FIG. 3, of lever 32 in counter-balancing the force exerted thereon by compression spring 60.

Through a hole in an upper lateral extension 32' of lever 32 is threaded screw 65 with nut 66 mounted thereon. A microswitch 68 is mounted to frame 30 with switch actuator 70 positioned beneath screw 65. Cable 72 extends from the microswitch through bracket 74 exteriorally of the apparatus. Insulated electrical conductors 75 and 76 within cable 72 are connected to two contacts (not shown) of the microswitch, respectively. As schematically shown in FIG. 4 conductor 75 may be connected by means of leads 96, 97 (and through the contacts of switch 93 when this switch is closed) to a source of electric current V and conductor 76 to a motor M which motor is adapted to drive feed mechanism 23 to feed material 10, 11 through the insulator-forming station 16 and other mechanisms of the equipment as schematically represented by dashed line 78. In this manner motor M may be connected in closed circuit across source V upon closure of microswitch 68 and thereby energized when "off-on" switch "S" is in the closed position.

For operation nuts 66 and 58 may be first positioned on screw 65 and adjust screw 54, respectively, to cause actuator 70 to separate the switch contacts of microswitch 68 upon predetermined travel by screw 65. Travel by screw 65 towards actuator 70 against the bias provided by the springs is effected by clockwise rotation of lever 32 as viewed in FIG. 3. Such clockwise movement may be caused by moving roller 36 away from roller 40 or by rotating lever 46 counterclockwise as seen in FIG. 3. Roller 36 will, of course, be moved away from roller 40 as the thickness of strip material passing therebetween is increased.

In the event the width of strip material 10, 11 being driven in the direction indicated by arrow 83 becomes too great to enter or to pass substantially unimpeded through slot 50, counterclockwise rotation (as viewed in FIG. 3) of the lever 46 will occur. Thus, should either the width or thickness of strip material 10, 11 exceed a preselected dimensional limit, or the strip includes break 13, 14 (FIG. 2) or other imperfections of sufficient magnitude to interfer with the proper operation of the insulator-forming station, lever 32 or lever 46 will rotate and actuate switch actuator 70. Microswitch 68 will thereupon open, causing motor M to be de-energized and terminate any further movement being imparted to the strip material. Motion of other mechanisms will also be interrupted before the material can travel into any mechanism where it could cause jamming or cause other damage in the insulator-forming station. Consequently the strip 10, 11 may be repaired at an accessible location prior to entry of the problem into the various mechanisms of the station.

Attached to mounting frame 30 adjacent rollers 36, 40 is a mechanism for monitoring and sensing or otherwise detecting the absence of material 10, 11 in the path of travel. This could occur for example if tape 12 were missing and strip material 11 were not therefore connected to the end of strip material 10 (improper splice); or is the trailing end of material 11 (see FIG. 1), remote from strip material 10, has passed beyond the mechanism. As illustrated primarily in FIGS. 1–4 inclusive this latter mechanism has a roller 91 and a movable roller 92 of a normally open microswitch 93 secured to plate 94 which is in turn attached to frame 30. Rollers 91 and 92 are positioned in alignment such that they are adapted to be in contact respectively on opposite sides of the strip of material 10, 11, roller 92 being biased in a direction toward roller 91. The normally open switch has its contacts connected in circuit with motor M by leads 96, 97.

With switch S closed and assuming that the contacts of microswitch 68 are also in a closed position, the contacts of switch 93 will be closed to complete the circuit across V so long as strip material 10, 11 is located or passes between rollers 91, 92. Should the material cease to occupy the proper space between the rollers 91, 92, roller 92 will be moved by a suitable spring in switch 93 toward roller 91 thereby opening the switch contacts and interrupting the closed circuit. Power to motor M will be discontinued and any operation controlled by motor M will cease. After strip material has again been placed between rollers 91, 92 the contacts of switch 93 will be disposed in a closed position so that the circuit will once again be completed to initiate operation of motor M.

Many modifications may, of course, be made to the exemplary apparatus just described. Where only ambulant strip material thickness is desired to be monitored lever 46 may be eliminated. Conversely, where only material width is desired to be monitored, lever 32 may be removed and lever 46 laterally extended, or the microswitch repositioned, to actuate the associated switch. In addition, the switch actuator may be positioned to be actuated upon counterclockwise rotation of lever 32, as viewed in FIG. 2, and thereby effect switch operation upon sensing too thin a portion of strip material passing between rollers 36 and 40. Similarly, lever 46 may be modified to sense too narrow a portion of strip material passing therethrough, such as by being mounted to pivot about a vertical axis as viewed in FIG. 3, with material passing in slidable engagement therewith.

Many different types of switches may, of course, be used other than microswitches. In addition, the relative position of the switch contacts may be reversed which is to say that they may be positioned to close upon sensing too thick or too wide a strip of material and thereby energize an associated relay or the like to terminate energization of motor M. That the associated circuitry includes electromechanical drive means for controllably feeding the strip materail itself is also, of course, purely optional, for in some applications only an informational output signal may be desired.

It will be appreciated that the present invention provides a number of advantages and benefits in addition to those already specifically mentioned above. Apparatus more in accordance with the preferred embodiment is of rugged construction, inexpensive to manufacture and easy to install on existing equipment. It is quite reliable and efficient in operation in spite of its low cost and its relatively small size. Further, the apparatus is versatile in nature and the same apparatus may be used, if desired, on different equipment with little change in construction of components.

Though preferred, the use of levers is not mandatory. Reciprocating actuators, for example, may be substituted therefor. In addition, other forms of apertures than the exemplified slot may be employed. Indeed, the need for an aperture itself may be entirely eliminated by fixing one side of the path along which the strip material moves during width monitoring and by having the other side of the path defined by a pivotal lever or the like. Of course, many other variations and modifications other than those herein specifically mentioned will be apparent to those skilled in the art without departure from the spirit and scope of the invention as set forth in the following claims.

What I claim as new and desire to secure by Letters Patent of the United States is:

1. A method of monitoring and controlling ambulant strip material in the manufacture of insulators for use in slots of inductive devices comprising the steps of:

passing a strip of material along a predetermined path with at least one strip edge passing closely adjacent an actuator having a strip engaging portion adapted to be moved generally parallel of the predetermined path when the strip of material is beyond at least on preselected dimensional limit;

bringing a portion of the strip into engagement with the strip engaging portion when the strip of material is beyond the at least one preselected dimensional limit causing the strip engaging portion to move in one direction generally parallel of the predetermined path; obstructing directly with the strip engaging portion further passage of the strip along the predetermined path with the strip engaging portion being jammed by said portion of said strip; and regulating movement of the strip of material, with means for controlling motion of the strip of material, in response to movement of the actuator.

2. The method of claim 1 further including terminating the passing of the strip of material along the predetermined path with the means for controlling motion of the strip of material when a portion of the strip is brought into engagement with the strip engaging portion.

3. The method of claim 1 wherein the means for controlling motion includes electric switch means, the method further including causing operation of the electric switch means and terminating movement of the strip engaging portion in the one direction when the electric switch means is operated.

4. A method of monitoring and controlling ambulant strip material in the manufacture of insulators for use in slots of inductive devices comprising the steps of:

passing a strip of material along a predetermined path through an insulator-forming station with at least one strip edge passing closely adjacent an actuator having a strip engaging portion adapted to be moved generally parallel of the predetermined path when the strip of material is beyond at least one preselected dimensional limit;

bringing a portion of the strip into engagement with the strip engaging portion when the strip of material is beyond the at least one preselected dimensional limit causing the strip engaging portion to move in one direction generally parallel of the predetermined path and to impede further passage of the strip along the predetermined path; and regulating movement of the strip of material, with means for controlling motion of the strip of material, in response to movement of the actuator; detecting the absence of the strip of material along the predetermined path; and terminating movement of the strip of material through the insulator-forming station in response to the detection of such absence.

5. A method of monitoring and controlling ambulant strip material in the manufacture of insulators for use in slots of inductive devices comprising the steps of:

a. moving a strip of material in the manufacture of insulators along a predetermined path of travel toward an insulator-forming assembly;

b. sensing at a location remote from the insulator-forming assembly the dimension of the strip of material in at least one direction when the dimension is beyond preselected variation as the strip of material passes along the predetermined path of travel;

c. controlling movement of the strip of material in response to the sensed dimension of the strip of material; and d. detecting the presence of the strip of material at a location along the predetermined path of travel whereby movement of the strip of material may be terminated once the presence of the strip of material is no longer detected.

6. The method of monitoring and controlling ambulant strip material comprising the steps of:

a. passing a strip of material along a predetermined path through an aperture of predetermined width in an actuator portion adapted to be moved generally parallel of said predetermined path, with the strip edges passing closely adjacent the width defining walls of the aperture;

b. bringing a portion of at least one of said strip edges into engagement with at least one of the width defining walls of the aperture causing the actuator portion to move in one direction generally parallel of said predetermined path and to impede passage of said strip in at least one direction along said predetermined path;

c. actuating means for controlling movement of said strip of material in response to movement of the actuator; and d. controlling the passing of said strip of material along said predetermined path through the aperture in response to the position of the means for controlling movement of said strip of material.

7. The method of claim 6 further including the step:

e. sensing the absence of said strip of material at a location along said predetermined path whereby the passing of said strip of material along said predetermined path may be terminated once such absence is detected.

8. The method of monitoring and controlling ambulant strip materials comprising the steps of:

a. passing a strip of material along a predetermined path through a slot in a portion of an actuator with the actuator portion being adapted for limited movement substantially parallel said predetermined path;

b. bringing a portion of said strip into engagement with at least one slot defining surface of said actuator portion causing said actuator portion to move in one direction substantially parallel said predetermined path and to impede further passage of said strip portion along said predetermined path;

c. actuating electric switch means in response to movement of said actuator portion; and d. terminating the passing of said strip portion along said predetermined path through said slot in response to actuation of the electric switch means.

9. The method of claim 8 including the step of detecting absence of coil strip along said predetermined path to terminate movement of said strip when such absence has been detected.

10. The method of monitoring and controlling ambulant strip materials comprising the steps of:

a. passing an elongated strip of material through first means for sensing strip thickness and for actuating termination of passage of said strip of material through said first means upon sensing thickness of a portion of said strip of material in excess of a preselected dimension; and b. passing said elongated strip of material thrugh second means for sensing strip width and for jamming further passage of said strip of material through said second means upon sensing width of a portion of said strip of material in excess of a preselected dimension.

11. The method of claim 10 wherein steps (a) and (b) are performed simultaneously.

12. The method of monitoring and controlling ambulant strips of material comprising the steps of:

a. passing an elongated strip of material through means for sensing an increase in at least one dimension of said strip of material over a preselected dimensional value;

b. sensing a portion of said strip of material having said at least one dimension in excess of said preselected dimensional value; and c. jamming further passage of said sensed portion of said strip of material through said sensing means.

13. Apparatus for monitoring and controlling ambulant strip material in the manufacture of insulators for use in inductive devices, the apparatus comprising a switch adapted to be connected in circuit with drive means for driving strip material and energizing means for controlling operation of said drive means; and actuating means for actuating said switch; said switch actuating means including a strip material engaging member defining at least part of a path along which strip material driven by said drive means may be passed, said strip material engaging member being mounted for limited movement generally parallel relative to the path, with said switch being actuated and said drive means thereby de-energized in the event that a portion of the monitored strip material is beyond a preselected dimensional limit and engages said strip material engaging member thereby causing said switch actuating means to actuate said switch; said apparatus further comprising a second actuating means for actuating said switch, when another portion of the monitored strip material is beyond another preselected dimensional limit, said second actuating means defining a second portion of said path along which strip material driving by said drive means may be passed.

14. Apparatus in accordance with claim 15 further comprising means for detecting the absence of the strip of material along said path and being connected in circuit with said drive means to open the circuit and terminate movement of the strip in response to detection of such absence.

15. Apparatus for monitoring and controlling ambulant strip material comprising a switch, a first switch actuator having an aperture in a first portion of said first switch actuator through which aperture ambulant strip material may be passed, said first switch actuator first portion being mounted for movement generally parallel the movement of ambulant strip material as it passes through said aperture, and a second switch actuator having a roller adapted to rollably contact a portion of said ambulant strip material as the ambulant strip material passes through said aperture.

16. Apparatus in accordance with claim 15 wherein at least one of said first and second switch actuators comprises a lever.

17. Apparatus in accordance with claim 16 wherein a portion of said first switch actuator is in contact with a portion of said second switch actuator while ambulant strip material passes through said aperture in contact with said roller.

18. Apparatus for monitoring and controlling ambulant strip material comprising a frame member; a lever pivotally mounted by said frame member and defining at least a part of an aperture through which a strip of material may be passed; and means mounted by said frame member adjacent said lever, for controlling movement of the strip material with strip material of one size being passed unimpededly through said aperture but strip material exceeding said one size being in engaging relation with said lever at the aperture such that said lever is caused to pivot by the engagement with the strip of material and actuate said switch means.

19. Apparatus in accordance with claim 18 wherein said lever is pivotally mounted about a pivot axis, and wherein the aperture generally parallels said pivot axis.

20. Apparatus in accordance with claim 18 further comprising means mounted to said frame member for sensing the absence of the strip of material in the vicinity of the aperture and for controlling movement of the strip of material when such absence is sensed.

21. Apparatus for monitoring and controlling ambulant strip material comprising a frame member, a swithch actuator mounted to said frame, a first lever pivotally mounted to said frame member about a first axis and defining a slot through which strip material may be passed, a first spring mounted to said frame member and to said first lever, a second lever pivotally mounted to said frame member about a second axis with said second axis substantially paralleling said first axis, a second spring mounted to said frame member and to said second axis, a first roller rotatably mounted to said second lever about a third axis with said third axis substantially paralleling said first and second axes, and a second roller rotatably mounted to said frame member about a fourth axis adjacent said first roller with said fourth axis substantially paralleling said third axis.

22. Apparatus in accordance with claim 21 wherein said first spring is a tension spring, and wherein said second spring is a compression spring.

23. Apparatus in accordance with claim 21 wherein said first lever is pivotally mounted to said frame member with a portion of said first lever in contact with a portion of said second lever, and wherein said second lever is pivotally mounted to said frame member to engage and depress said switch actuator upon being pivoted.

* * * * *